United States Patent [19]
Ogita et al.

[11] Patent Number: 6,074,735
[45] Date of Patent: Jun. 13, 2000

[54] PRINTING BLANKET

[75] Inventors: Toshikazu Ogita, Miki; Makoto Sakuraoka, Kobe; Seiji Tomono, Kobe; Hiromasa Okubo, Kobe; Takamichi Sagawa, Akashi, all of Japan

[73] Assignee: Sumitomo Rubber Industries, Ltd., Hyogo, Japan

[21] Appl. No.: 08/979,169

[22] Filed: Nov. 26, 1997

[30] Foreign Application Priority Data

Nov. 27, 1996 [JP] Japan ................................. 8-316648

[51] Int. Cl.⁷ .......................... B41N 1/22; B32B 25/00
[52] U.S. Cl. ................... 428/222; 428/909; 428/304.4
[58] Field of Search ................... 428/909, 222, 428/304.4, 306.6, 319.3

[56] References Cited

U.S. PATENT DOCUMENTS

| | | | |
|---|---|---|---|
| 3,887,750 | 6/1975 | Duckett et al. | 428/909 X |
| 4,093,764 | 6/1978 | Duckett et al. | 428/909 X |
| 5,334,418 | 8/1994 | Byers et al. | 428/909 X |
| 5,347,927 | 9/1994 | Berna et al. | 428/213 X |
| 5,352,507 | 10/1994 | Bresson et al. | 428/909 X |
| 5,440,981 | 8/1995 | Vrotacoe et al. | 428/909 X |
| 5,456,171 | 10/1995 | Biava et al. | 428/909 X |

FOREIGN PATENT DOCUMENTS

| | | |
|---|---|---|
| A-53-35028 | 4/1978 | Japan . |
| A-54-50620 | 4/1979 | Japan . |
| A-57-61717 | 4/1982 | Japan . |
| A-63-175110 | 7/1988 | Japan . |
| A-3-90613 | 4/1991 | Japan . |

*Primary Examiner*—Daniel Zirker
*Attorney, Agent, or Firm*—Birch, Stewart, Kolasch & Birch, LLP

[57] ABSTRACT

A printing blanket according to the present invention is provided with a non-stretchable layer formed by arranging hollow yarn in a predetermined direction inside a surface printing layer constituting an elastomer. The printing blanket is and formed in a seamless cylindrical shape in the circumferential direction, is superior in productivity because it has a simpler structure than that of an air-type printing blanket, and has excellent compression properties similar to those of the air-type printing blanket.

18 Claims, 5 Drawing Sheets

F I G. 5
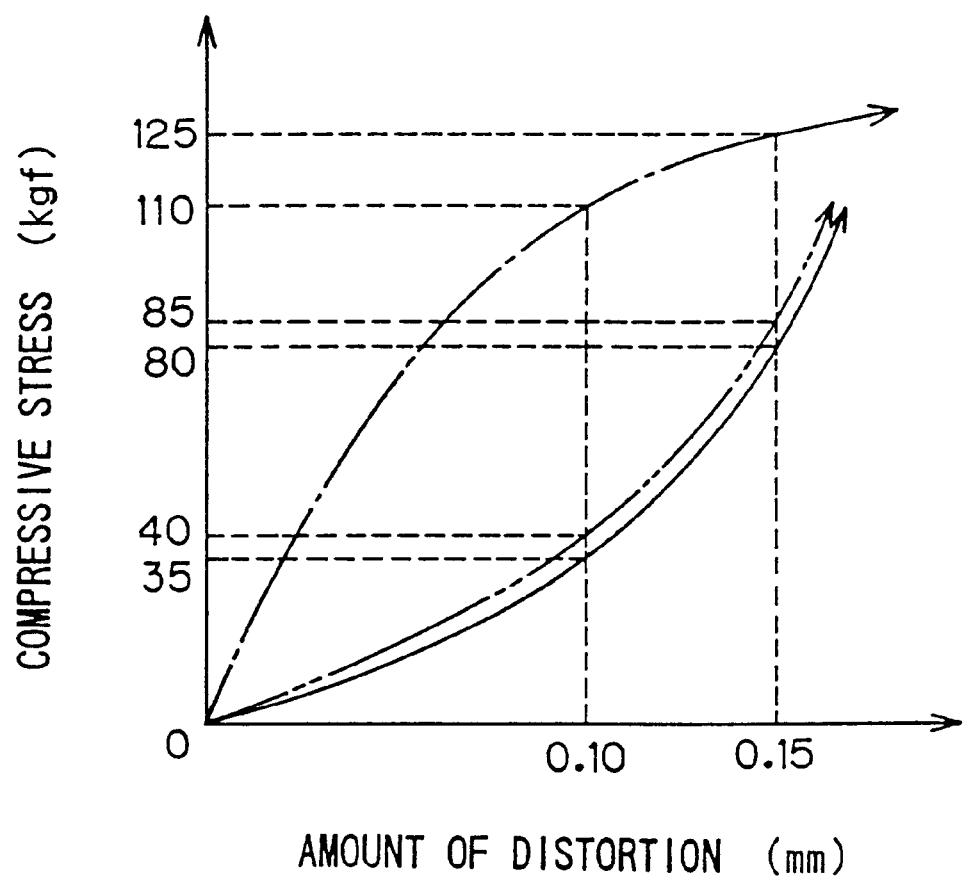

PRINTING BLANKET

BACKGROUND OF THE INVENTION

1. Field of the Invention

The present invention relates to a printing blanket in a seamless cylindrical shape which is particularly suitable for use in high-speed printing presses such as high-speed web offset printing press.

2. Description of the Prior Art

Examples of a printing blanket particularly suitable for the above-mentioned high-speed printing presses include one in a seamless cylindrical shape in the circumferential direction.

Such a printing blanket in a cylindrical shape is constructed by suitably laminating on an outer peripheral surface of a cylindrical sleeve mounted on a blanket cylinder of a printing press a porous and seamless compressible layer comprising an elastomer such as rubber, a non-stretchable layer formed by winding a non-stretchable thread in helical fashion in the circumferential direction, and the like, and laminating on the uppermost layer a seamless surface printing layer similarly comprising an elastomer such as rubber.

A so-called air-type printing blanket having a porous compressible layer inside the surface printing layer is lower in compressive stress in a nip deformed portion produced by being pressed against a plate cylinder, as compared with a solid-type printing blanket having no compressible layer, as indicated by a two-dot and dash line in FIG. 4, for example.

A variation from $P_{a1}$ to $P_{a2}$ of the compressive stress in a case where the amount of distortion in the nip deformed portion is changed from $\epsilon_1$ to $\epsilon_2$ is smaller than a variation from $P_{s1}$ to $P_{s2}$ of the compressive stress in the solid-type printing blanket, as shown in FIG. 4.

Therefore, the air-type printing blanket is high in impact absorbability, and is superior in the effect of preventing impact produced at the time of feeding gears of the printing press, for example, from affecting printing precision.

The solid-type printing blanket causes so-called bulge by stress concentrations on the surface printing layer in the nip deformed portion, which might result in inferior printing such as out of register due to expansion in the circumferential direction, inferior paper feeding, double, or deformation of a dot pattern (particularly, dot gain). On the other hand, the air-type printing blanket also has the effect of preventing the above-mentioned inferior printing because the compressible layer has the function of lowering stress concentrations on the surface printing layer.

The examples include a compressible layer having a closed cell structure in which voids are independent of each other, which is formed by (i) foaming matrix rubber composing the compressible layer by an expanding agent which is decomposed by heating to emit gas, or (ii) blending a hollow microsphere with matrix rubber, for example, and a compressible layer having an open cell structure in which voids connect with each other, which is formed by (iii) a so-called leaching method for dispersing in matrix rubber particles, such as common salt particles, extractable by a solvent (water in the case of the common salt particles) which does not affect rubber, vulcanizing the matrix rubber, and then extracting the particles.

In order to form the compressible layer, however, a lot of complicated steps are required even in the printing blanket having either one of the structures as described above. Therefore, the air-type printing blanket is low in productivity than the solid-type printing blanket.

SUMMARY OF THE INVENTION

An object of the present invention is to provide a new printing blanket which is superior in productivity because it has a simpler structure than that of an air-type printing blanket, and has excellent compression properties similar to those of the air-type printing blanket.

A printing blanket according to the present invention comprises at least (a) a surface printing layer comprising an elastomer and formed in a cylindrical shape having no seams in the circumferential direction, and (b) a non-stretchable layer arranged inside the surface printing layer and formed by arranging hollow yarn having a cavity within in a predetermined direction.

In the printing blanket according to the present invention, the non-stretchable layer is formed by arranging hollow yarn having a cavity within in a predetermined direction as described above. The cavity in the hollow yarn functions similarly to the voids in the conventional compressible layer, whereby the compressible layer can be omitted. Accordingly, the printing blanket according to the present invention is superior in productivity because it has a simpler structure than that of the air-type printing blanket, and has excellent compression properties similar to those of the air-type printing blanket.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1(a) is a partially enlarged sectional view, and FIG. 1(b) is a cross-sectional view of hollow yarn, which can be used in place of monofilament hollow yarn used in FIG. 1(a), obtained by converging in parallel and integrating a plurality of hollow fibers or twisting the plurality of hollow fibers;

FIG. 5 is a graph showing the relationship between the amount of distortion and compressive stress in the printing blankets in the examples and the comparative examples.

DETAILED DESCRIPTION OF THE INVENTION

Figure 1:
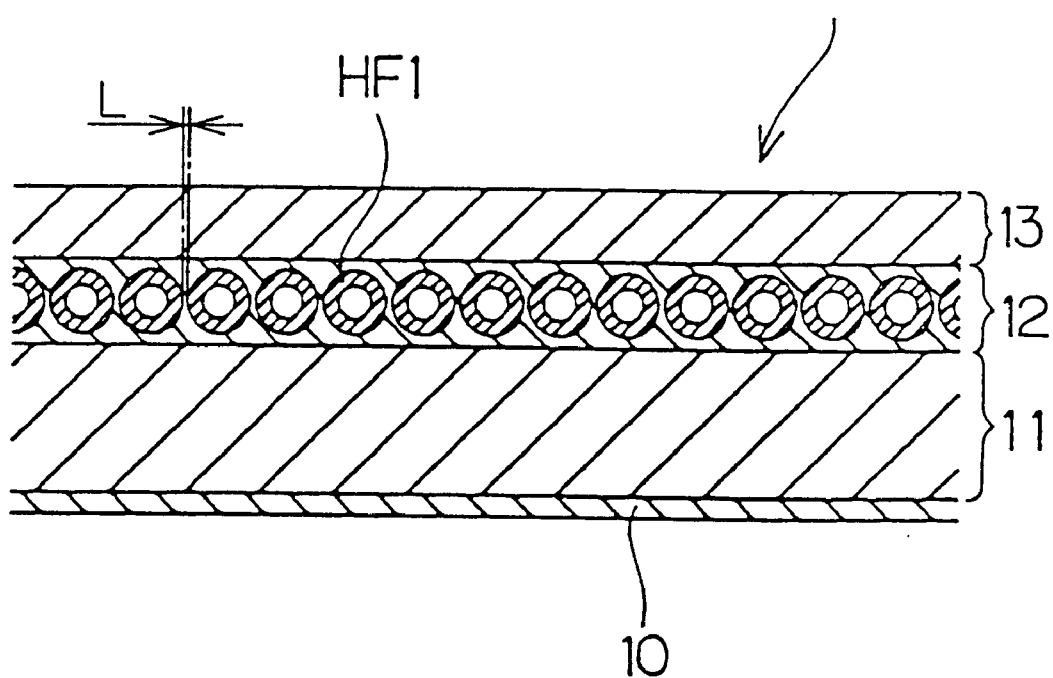
FIG. 1 is a diagram showing one embodiment of a printing blanket according to the present invention, where
Figure 1:
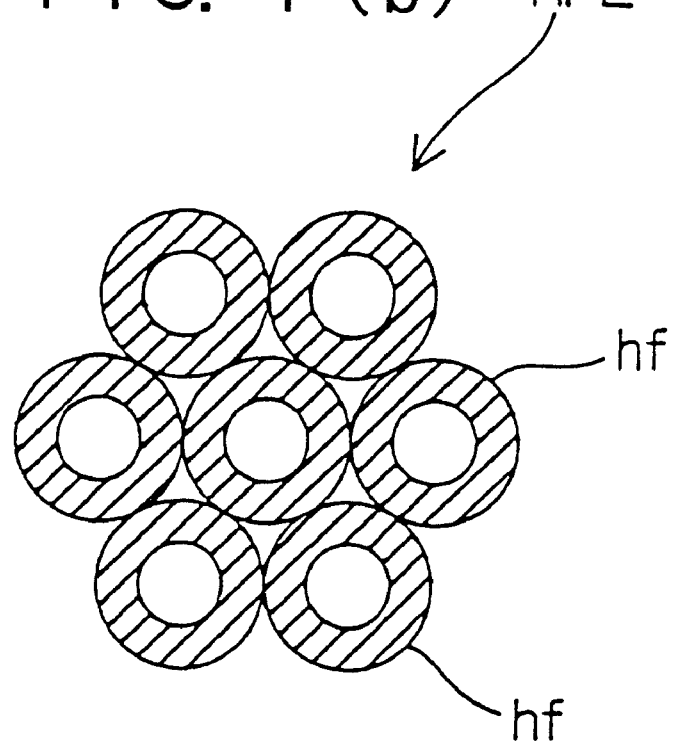

Referring now to the drawings, the present invention will be described.

Figure 2:
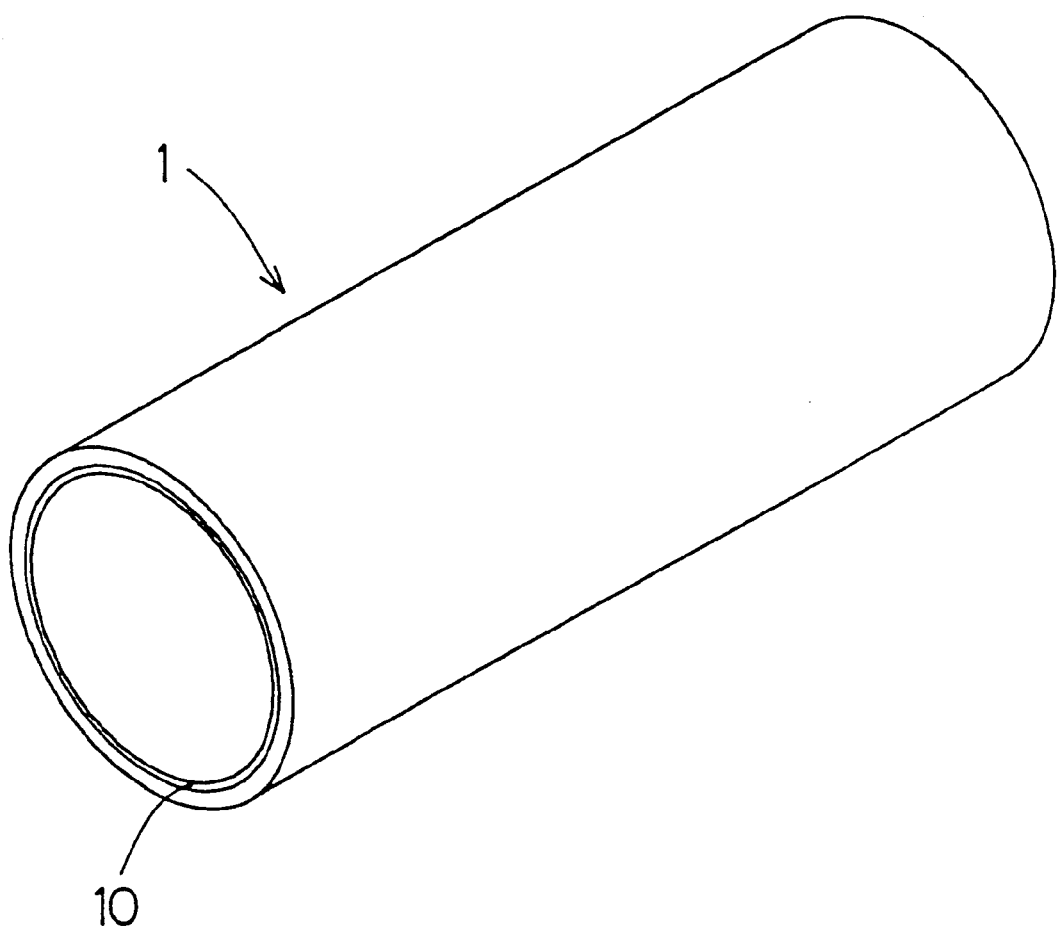
FIG. 2 is a perspective view showing the whole of the printing blanket according to the above-mentioned embodiment.

A printing blanket 1 according to the present embodiment is formed on an outer peripheral surface of a cylindrical sleeve 10, as shown in FIG. 2, and has a base layer 11, a non-stretchable layer 12, and a surface printing layer 13 laminated in this order on the sleeve 10, as shown in FIG. 1(a).

The non-stretchable layer 12 is formed by winding on the base layer 11 a single layer of monofilament hollow yarn HF1 in helical fashion in the circumferential direction.

In the present invention, the above-mentioned hollow yarn HF1 may be replaced with hollow yarn HF2 obtained by integrating a plurality of hollow fibers hf as shown in FIG. 1(b), for example. Examples of such hollow yarn HF2 include a fiber bundle obtained by converging in parallel and integrating a plurality of hollow fibers hf without intentionally twisting the hollow fibers and twist yarn obtained by twisting a plurality of hollow fibers hf.

As the monofilament hollow yarn HF1 or the hollow fibers hf composing the hollow yarn HF2, all of a variety of conventionally known fibers made of synthetic resin each having a cavity within can be used.

For example, each of the monofilament hollow yarn HF1 and the hollow fibers composing the hollow yarn HF2 is circular in outer cross section, has only one cavity circular in cross section continuously provided along its length in its central part. Both the hollow yarn HF1 and the hollow fibers hf have the advantage in that stress properties with respect to compression are uniform.

However, each of the shapes of the outer cross section and the cross section of the cavity may be various shapes other than a circle. The number of cavities is not limited to one. Two or more cavities may be so formed as to be parallel to each other. Further, the cavities may be not continuous but intermittent.

Examples of the synthetic resin composing each of the hollow yarn HF1 and the hollow yarn HF2 include polyester, rayon, nylon, aromatic polyamide, and acrylic resin.

Specific examples of the hollow yarn HF1 and the hollow yarn HF2 include ones disclosed in Japanese Patent Laid-Open No. 35028/1978, Japanese Patent Laid-Open No. 50620/1979, Japanese Patent Laid-Open No. 61717/1982, Japanese Patent Laid-Open No. 175110/1988, Japanese Patent Laid-Open No. 90613/1991, etc., or "New S-UP" available from Toyobo Co., Ltd., "RX 21" available from Toyobo Co., Ltd., "S-Marble" available from Toyobo Co., Ltd., triangular hollow yarn for a carpet available from Toyobo Co., Ltd., triangular hollow yarn for a carpet available from Asahi Chemical Industry Co., Ltd., and square hollow yarn for a carpet available from Asahi Chemical Industry Co., Ltd, etc., which are not limitations.

When the non-stretchable layer 12 is formed of the monofilament hollow yarn HF1, the outside diameter of the hollow yarn HF1 is preferably 0.1 to 1.0 mm, and more preferably 0.25 to 0.7 mm.

In a case where the outside diameter of the hollow yarn HF1 is less than the above-mentioned range, the size of the cavity formed within is limited. Particularly when a single layer of hollow yarn HF1 is wound in the circumferential direction to form the non-stretchable layer 12 as shown, the porosity of the non-stretchable layer 12 is decreased, resulting in the possibility that the compression properties of the printing blanket are degraded. On the contrary, when the outside diameter of the hollow yarn HF1 exceeds the above-mentioned range, the porosity of the non-stretchable layer 12 is large, and the compressive stress is too low, resulting in the possibility that sufficient solid applicability cannot be given to the printing blanket.

The inside diameter of the cavity in the monofilament hollow yarn HF1 may be suitably set depending on the outside diameter, the arrangement of the cavity, and the like. In the case of only one cavity formed in the central part of the hollow yarn HF1 as shown, however, the inside diameter of the cavity is preferably 0.05 to 0.5 mm, and more preferably 0.12 to 0.4 mm.

When the inside diameter of the cavity is less than the above-mentioned range, there is a possibility that the compression properties of the printing blanket are degraded as described above. On the contrary, when the inside diameter of the cavity exceeds the above-mentioned range, there is a possibility that sufficient solid applicability cannot be given to the printing blanket as described above.

When two or more cavities are so formed as to be parallel to each other in the hollow yarn, the inside diameter of each of the cavities may be less than the above-mentioned range.

On the other hand, when the non-stretchable layer 12 is formed of the hollow yarn HF2 obtained by converging in parallel and integrating the plurality of hollow fibers hf or twisting the plurality of hollow fibers hf, the outside diameter of the hollow yarn HF2 is preferably 0.1 to 1.0 mm, and more preferably 0.25 to 0.7 mm.

When the outside diameter of the hollow yarn HF2 is less than the above-mentioned range, the size of the cavity formed inside each of the hollow fibers hf is limited, which depends on the number of the hollow fibers hf composing the hollow yarn HF2. Particularly when a single layer of hollow yarn HF2 is wound in the circumferential direction to form the non-stretchable layer 12, the porosity of the non-stretchable layer 12 is decreased, resulting in the possibility that the compression properties of the printing blanket are degraded. On the contrary, when the outside diameter of the hollow yarn HF2 exceeds the above-mentioned range, the porosity of the non-stretchable layer 12 is large, and the compressive stress is too low, resulting in the possibility that sufficient solid applicability cannot be given to the printing blanket.

The outside diameter and the number of the hollow fibers hf composing the hollow yarn HF2 are not particularly limited. The outside diameter and the number may be set by the above-mentioned relationship with the outside diameter of the hollow yarn HF2. For example, when a plurality of hollow fibers hf having an outside diameter of approximately 40 $\mu$m are converged or twisted to form the hollow yarn HF2 having an outside diameter of approximately 0.5 mm, the number of the hollow fibers hf is approximately 100 to 150.

The non-stretchable layer 12 comprising the hollow yarn HF1 or the hollow yarn HF2 can be formed by a method similar to the conventional method.

That is, the non-stretchable layer 12 is formed by winding the hollow yarn HF1 or the hollow yarn HF2 around the base layer 11 coated with a rubber cement in helical fashion while applying a tensile force, and then vulcanizing and fixing the rubber cement.

Although the porosity of the non-stretchable layer 12 is not particularly limited in the present invention, it is preferably 10 to 80%, and more preferably 20 to 70%.

When the porosity of the non-stretchable layer 12 is less than the above-mentioned range, there is a possibility that the compression properties of the printing blanket are degraded. On the contrary, when it exceeds the above-mentioned range, the compressive stress is too low, resulting in the possibility that sufficient solid applicability cannot be given to the printing blanket. The porosity (%) is found by the following equation (1) from the cross-sectional area $S_1$ of the cross section of the non-stretchable layer 12 (the cross section shown in FIG. 1(a)) along a plane including its axis of rotation and the total $S_2$ of the areas of the cross sections of the cavity in the hollow yarn HF on the above-mentioned cross section:

Porosity (%)=$S_2/S_1 \times 100$ (1)

The sleeve 10, the base layer 11, and the surface printing layer 13 which together with the non-stretchable layer 12, constitute the printing blanket 1 can be constructed similarly to those in the conventional example.

Examples of the sleeve 10 include one formed of a very thin metallic material such as a nickel thin plate, or one formed of glass fiber reinforced plastic.

Each of the base layer 11 and the surface printing layer 13, both of which are not essentially porous, is formed in a seamless cylindrical shape by an elastomer such as vulcanized rubber.

In order to form each of the layers in a seamless cylindrical shape by the vulcanized rubber, rubber may be vulcanized after applying an unvulcanized rubber cement for the layer on the sleeve 10 in the case of the base layer 11 or on the non-stretchable layer 12 in the case of the surface printing layer 13 directly or with a rubber cement for adhesion interposed therebetween, and drying the rubber cement. Alternatively, an unvulcanized rubber sheet formed of a rubber compound for the layer may be vulcanized in a state where it is wound on the sleeve 10 or the non-stretchable layer 12 with the rubber cement for adhesion interposed therebetween, to weld and integrate seams in the circumferential direction.

As the rubber composing the base layer 11, oil-resistant rubber such as acrylonitrile-butadiene copolymer rubber (NBR), chloroprene rubber (CR), or urethane rubber (U) is suitably used. On the other hand, as the rubber composing the surface printing layer 13, the above-mentioned oil-resistant rubber such as NBR, CR, or U is suitably used. In addition thereto, polysulfide rubber (T), hydrogenated NBR, or the like can be also used.

The thickness of each of the above-mentioned layers may be approximately the same as that in the conventional example. Specifically, it is preferable that the thickness of the base layer 11 is approximately 0.5 to 2.0 mm, and the thickness of the surface printing layer 13 is approximately 0.1 to 0.6 mm.

The above-mentioned layers constituting the printing blanket 1 are successively laminated from the layer near the sleeve 10 to the outer layer. Each layer may be vulcanized every time it is formed. Alternatively, a plurality of layers may be collectively vulcanized.

The printing blanket 1 in a cylindrical shape is used upon being mounted on the blanket cylinder of the printing press.

Various types of additives can be blended with the rubber compound or the rubber cement for each of the layers constituting the printing blanket 1 described above, as in the conventional example.

Examples of such additives include an antioxidant, a reinforcer, a filler, a softener, and a plasticizer in addition to compounds for vulcanizing rubber such as a vulcanizing agent, a vulcanization accelerator, an activator, and a retarder. The amount of addition of the additive may be approximately the same as that in the conventional example.

Examples of the above-mentioned vulcanizing agent include sulfur, an organic sulfur compound, and an organic peroxide. Examples of the organic sulfur compound include N,N'-dithiobismorpholine. Examples of the organic peroxide include benzoyl peroxide and dicumyl peroxide.

Examples of the vulcanization accelerator include organic accelerators such as thiuram vulcanization accelerators such as tetramethylthiuramdisulfide and tetramethylthiuram-monosulfide; dithiocarbamic acids such as zinc dibutyldithiocarbamate, zinc diethyldithiocarbamate, sodium dimethyldithiocarbamate, and tellurium diethyldithiocarbamate; thiazoles such as 2-mercaptobenzothiazole and N-cyclohexyl-2-benzothiazolylsulfenamide; and thioureas such as trimethylthiourea and N,N'-diethylthiourea, or inorganic accelerators such as calcium hydroxide, magnesium oxide, titanium oxide, and litharge (PbO).

Examples of the activator include metal oxides such as zinc oxide, or fatty acids such as stearic acid, oleic acid, and cottonseed fatty acid.

Examples of the retarder include aromatic organic acids such as salicylic acid, phthalic anhydride, and benzoic acid; and nitroso compounds such as N-nitrosodiphenylamine, N-nitroso-2,2,4-trimethyl-1,2-dihydroquinone, and N-nitorosophenyl-β-naphtylamine.

Examples of the antioxidant include imidazoles such as 2-mercaptobenzimidazole; amines such as phenyl-α-naphthylamine, N,N'-di-β-naphthyl-p-phenylenediamine, and N-phenyl-N'-isopropyl-p-phenylenediamine; and phenols such as di-t-butyl-p-cresol and styrenated phenol.

As the reinforcer, carbon black is mainly used. Further examples of the reinforcer include inorganic reinforcers such as silica or silicate white carbon, zinc oxide, surface treated precipitated calcium carbonate, magnesium carbonate, talc, and clay, or organic reinforcers such as coumarone-indene resin, phenol resin, and high styrene resin (a styrene-butadiene copolymer having a large styrene content).

Examples of the filler include inorganic fillers such as calcium carbonate, clay, barium sulfate, diatomaceous earth, mica, asbestos, and graphite, or organic fillers such as reclaimed rubber, rubber powder, asphalts, styrene resin, and glue.

Examples of the softener include various softeners of a vegetable oil, a mineral oil and a synthetic oil such as fatty acids (stearic acid, lauric acid, etc.), cottonseed oil, tall oil, asphalts, and paraffin wax.

Examples of the plasticizer include various plasticizers such as dibutyl phthalate, dioctyl phthalate, and tricresyl phosphate.

In addition thereto, a tackifier, a dispersant, a solvent, or the like may be suitably blended with rubber.

The construction of the printing blanket according to the present invention is not limited to that in the above-mentioned embodiment. Various design changes can be made in the range in which the gist of the present invention is not changed.

The non-stretchable layer 12 may be formed by winding two or more layers of hollow yarn of each of the above-mentioned various types in the circumferential direction. Two or more non-stretchable layers out of the respective layers constituting the printing blanket may be arranged in adjacent positions or may be arranged in distant positions.

Furthermore, the non-stretchable layer may be formed by not winding monofilament hollow yarn, a fiber bundle, twist yarn, or the like in helical fashion but arranging a plurality of pieces of monofilament hollow yarn, fiber bundles and pieces of twist yarn in parallel.

As described in the foregoing, when two or more layers of hollow yarn are wound to form the non-stretchable layer, the size such as the outside diameter of the hollow yarn may be less than the above-mentioned range.

In the present invention, the construction of the layer other than the non-stretchable layer can be also suitably changed.

In short, if the non-stretchable layer arranged Inside the surface printing layer is formed by arranging hollow yarn in a predetermined direction, the other construction is not particularly limited in the present invention.

As described detail in the foregoing, according to the present invention, there can be provided a printing blanket which is superior in productivity because it has a simpler structure than that of an air-type printing blanket, and has excellent compression properties similar to those of the air-type printing blanket.

EXAMPLES

Examples 1

An unvulcanized rubber sheet having a thickness of 2.0 mm composed of a rubber compound containing unvulcanized NBR was wound around an outer peripheral surface of a cylindrical sleeve made of nickel having an inside diameter of 169.5 mm, having a length of 910 mm, and having a thickness of 0.15 mm with an adhesive layer having a two-layer structure comprising a layer of Chemlock 205 and a layer of Chemlock 252X which are available from Lord Chemical Co., Ltd. interposed therebetween, and the adhesive layer and the sheet was then vulcanized in a state where the surface of the sheet was wrapped. The surface of the sheet after the vulcanization was polished, to form a base layer being 1.20 mm in thickness including the thickness of the adhesive layer and having no seams in the circumferential direction.

An adhesive layer (0.05 mm in thickness) was then formed of a rubber cement containing unvulcanized NBR on the above-mentioned base layer, and monofilament hollow yarn made of acrylic resin which is circular in cross section and has only one cavity circular in cross section provided continuously along its length in its central part [RX21 available from Toyobo Co., Ltd.; 0.50 mm in outside diameter and 0.30 mm in inside diameter at the cavity] was wound thereon in helical fashion in such a manner that the spacing L [shown in FIG. 1(a)] between its adjacent parts is not more than 0.05 mm while applying a tensile force of 450±10 gf. The adhesive layer was then vulcanized in a state where the surface of the hollow yarn was wrapped. Thereafter, an adhesive layer (0.05 mm in thickness) was formed thereon of a rubber cement containing unvulcanized NBR, a rubber cement for a surface printing layer containing unvulcanized NBR was spread thereon and dried, and the adhesive layer and the surface printing layer were vulcanized in a state where the surface of the surface printing layer was wrapped. The surface of the surface printing layer after the vulcanization was polished, to laminate on the base layer a non-stretchable layer having a thickness of 0.6 mm which comprises hollow yarn and adhesive layers above and below the hollow yarn and a surface printing layer having a thickness of 0.25 mm and having no seams in the circumferential direction in this order, thereby producing a printing blanket in a seamless cylindrical shape having the layer structure shown in FIG. 1(a) and having a total thickness of 2.2 mm.

Examples 2 to 7

A printing blanket in a seamless cylindrical shape having the layer structure shown in FIG. 1(a) was produced in the same manner as that in the example 1 except that monofilament hollow yarn (made of acrylic resin) which differs in the outside diameter and the inside diameter of the cavity was used, as shown in the following Table 1.

Example 8

A printing blanket in a seamless cylindrical shape was produced in the same manner as that in the example 1 except that the monofilament hollow yarn was replaced with hollow yarn (0.50 mm in outside diameter) obtained by converging in parallel 100 to 150 hollow fibers made of polyester each being circular in outer cross section and having only one cavity circular in cross section continuously provided along its length in its central part [S-Marble available from Toyobo Co., Ltd ; 40 μm in outside diameter and 15 μm in inside diameter at the cavity].

Examples 9 to 17

A printing blanket in a seamless cylindrical shape was produced in the same manner as that in the example 1 except that hollow yarn (0.50 mm in outside diameter) obtained by twisting 100 to 150 hollow fibers (made of polyester) which differs in the inside diameter of the cavity was used, as shown in the following Table 2.

Comparative example 1

A solid-type printing blanket in a seamless cylindrical shape was produced in the same manner as that in the example 1 except that the monofilament hollow yarn was replaced with a normal cotton string having no cavity within (NE16/4; 0.500 mm in diameter).

Comparative example 2

An unvulcanized rubber sheet having a thickness of 2.0 mm composed of a rubber compound containing unvulcanized NBR was wound around an outer peripheral surface of a cylindrical sleeve made of nickel of the same size as that used in the example 1 with an adhesive layer having a two-layer structure comprising a layer of Chemlock 205 and a layer of Chemlock 252X which are available from Lord Chemical Co., Ltd. interposed therebetween, and the adhesive layer and the sheet were then vulcanized in a state where the surface of the sheet was wrapped. The surface of the sheet after the vulcanization was polished, to form a base layer being 1.10 mm in total thickness including the thickness of the adhesive layer and having no seams in the circumferential direction.

An adhesive layer (0.05 mm in thickness) was then formed of a rubber cement containing unvulcanized NBR on the above-mentioned base layer, a rubber cement containing unvulcanized NBR and blended with common salt particles for a compressible layer was spread thereon and dried, and the adhesive layer and the compressible layer were vulcanized in a state where the surface of the compressible layer was wrapped. Thereafter, the common salt particles were extracted after being immersed for twelve hours in warm water having a temperature of 70° C. by leaching treatment, and was dried, to form the compressible layer having an open cell structure and having no seams in the circumferential direction (0.30 mm in thickness, 40% in porosity, 90° in JIS C hardness of matrix rubber).

An adhesive layer (0.05 mm in thickness) was then formed of a rubber cement containing unvulcanized NBR on the above-mentioned compressible layer, and a normal cotton string (0.250 mm in diameter) having no cavity within was wound thereon in helical fashion in such a manner that the spacing between its adjacent parts was not more than 0.05 mm while applying a tensile force of 450±10 gf. The adhesive layer was then vulcanized in a state where the surface of the cotton string was wrapped. Thereafter, an adhesive layer (0.05 mm in thickness) was formed thereon of a rubber cement containing unvulcanized NBR, a rubber cement for a surface printing layer containing unvulcanized NBR was spread thereon and dried, and the adhesive layer and the surface printing layer were vulcanized in a state where the surface of the surface printing layer was wrapped. The surface of the surface printing layer after the vulcanization was polished, to laminate a non-stretchable layer having a thickness of 0.3 mm which comprises normal cotton string and adhesive layers above and below the string and a surface printing layer having a thickness of 0.25 mm and having no seams in the circumferential direction in this order on the above-mentioned base layer, thereby producing an air-type printing blanket in a seamless cylindrical shape.

The following test was conducted with respect to each of the printing blankets produced in the above-mentioned examples and comparative examples, to evaluate the properties thereof.

Figure 3:
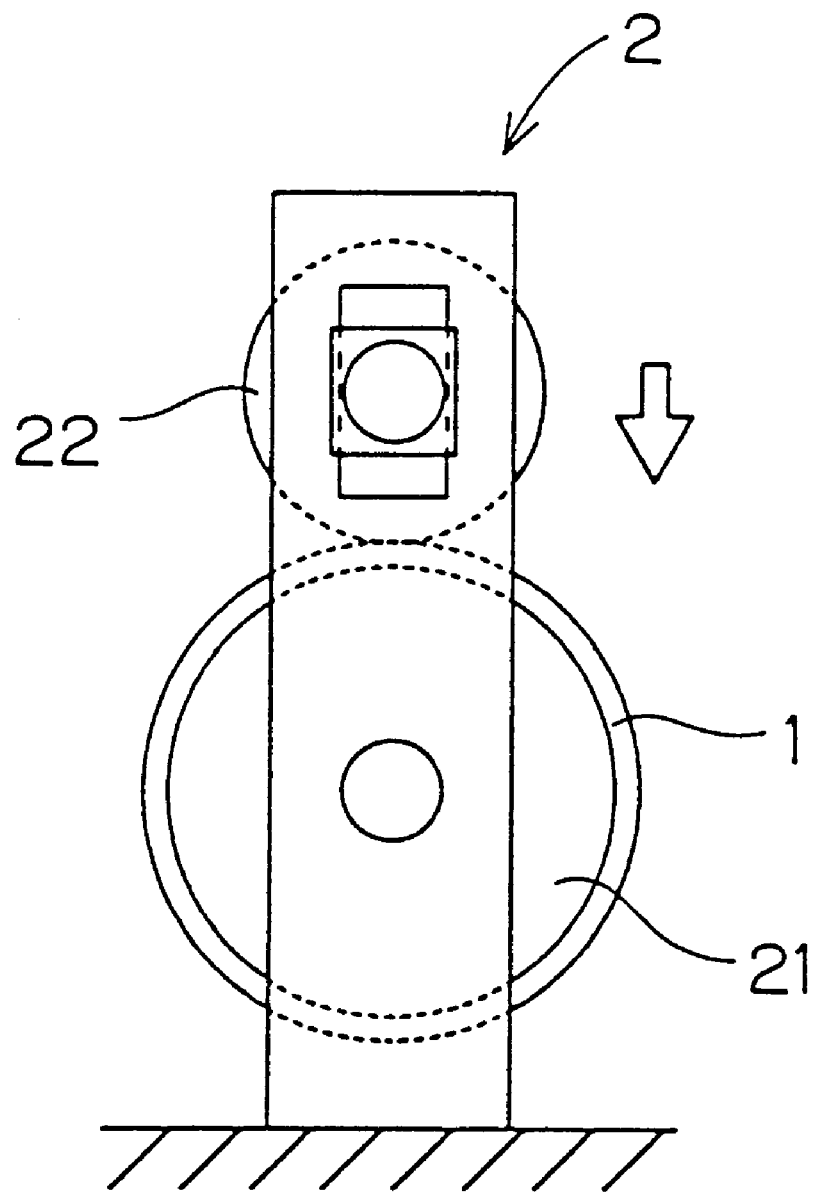
FIG. 3 is a front view of an apparatus for measuring the compression properties of printing blankets produced in examples and comparative examples.
Figure 4:
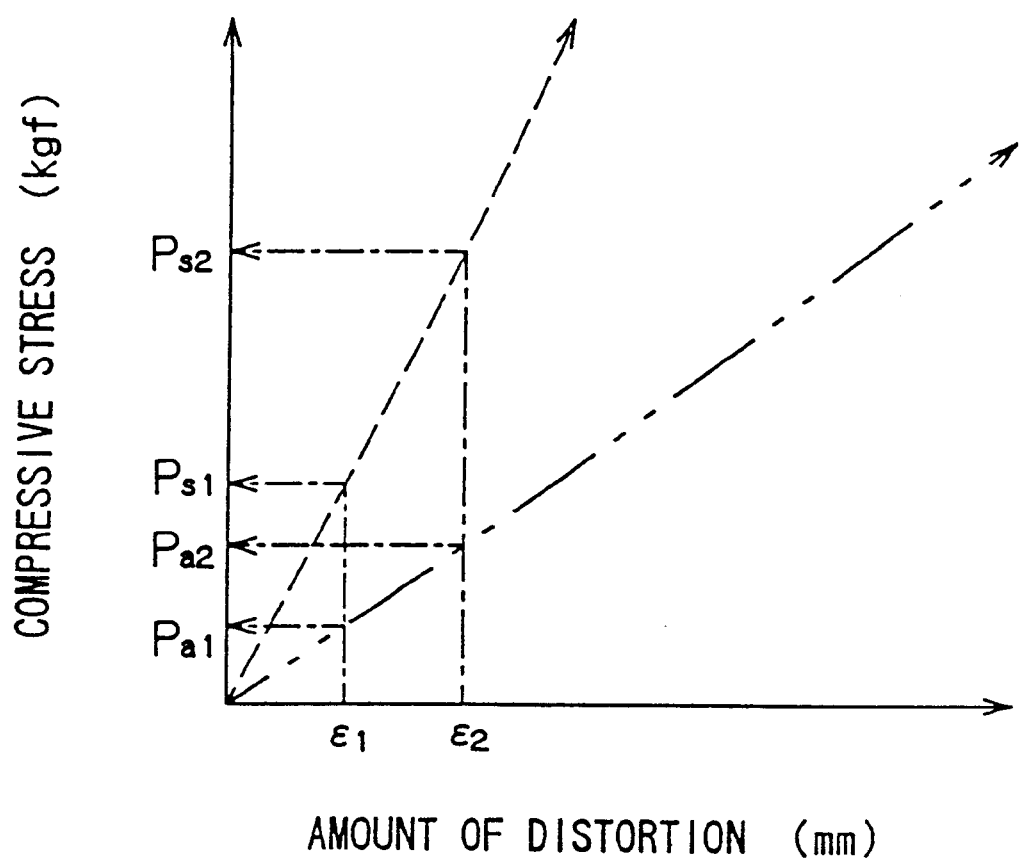
FIG. 4 is a graph showing the compression properties, that is, the relationship between the amount of distortion and compressive stress in the printing blankets having various structures.

Test for compression properties When in a state where each of the printing blankets 1 in the example 1 and 8 and the comparative examples 1 and 2 out of the examples and the comparative examples was mounted on a cylinder 21 in a testing apparatus 2 shown in FIG. 3, an impression cylinder 22 serving as a model of a plate cylinder was pressed against the surface of the printing blanket 1, to distort the printing blanket 1, compressive stress (kgf) produced depending on the amount of the distortion (mm) was measured.

The results were shown in FIG. 5. A curve indicated by a solid line in FIG. 5 shows the results of the example 8, a curve indicated by a two-dot and dash line shows the results of the example 1 and the comparative example 2, and a curve indicated by a one-dot and dash line shows the results of the comparative example 1.

As apparent from FIG. 5, it was confirmed that the printing blanket in the example 1 had excellent compression properties similar to those in the comparative example 2 which is of an air type, although it had a simple structure similar to that in the comparative example 1 which is of a solid type, and the printing blanket in the example 8 had a simple structure similar to those in the example 1 and the comparative example 1 and further had more excellent compression properties than those in the comparative example 2.

Measurement of ratio of change in peripheral length

The ratio of change in peripheral length for each of the printing blankets in the examples and the comparative examples was measured using the above-mentioned testing apparatus 2 shown in FIG. 3.

Specifically, in a state where each of the printing blankets 1 was mounted on the cylinder 21 in the testing apparatus 2 as described above, and the impression cylinder 22 was pressed against the surface of the printing blanket 1 in a predetermined amount of depression, the cylinder 21 was rotated a predetermined number of times. The ratio of change in peripheral length (%) of the printing blanket 1 was found from the resultant difference in the number of revolutions between the cylinder 21 and the impression cylinder 22.

The measuring conditions were as follows:

Diameter of the cylinder 21 : 169.520 mm

Diameter of the impression cylinder 22 : 173.915 mm

The amount of depression of the cylinder 22 into the printing blanket 1 : 0.1 mm The rotational speed of the cylinder 21 : 100 r.p.m.

The number of revolutions of the cylinder 21 : 500 times

In the case of the measurement, it was confirmed whether the difference in the number of revolutions between the cylinder 21 and the impression cylinder 22 was plus (the impression cylinder was rotated a larger number of times than the cylinder 21) or minus (the impression cylinder 22 was rotated a smaller number of times than the cylinder 21) every 100 revolutions. As a result, it was found that all the differences in the number of revolutions were plus.

Since the printing blanket which is high in the ratio of change in peripheral length is insufficient in the above-mentioned compression properties, a printed image is made unclear, resulting in degraded printing quality. Therefore, it is preferred that the ratio of change in peripheral length is small. Its specific numerical value is preferably not more than 0.20% and particularly not more than 0.15%.

Measurement of standard deviation in luminance

Each of the printing blankets in the examples and the comparative examples was mounted on a high-speed web offset printing press, to do 3×3 mm solid printing on the surface of wood free paper using oil based ink of Japanese-ink color.

The standard deviation in luminance for solid parts of the above-mentioned printing was measured using an image processing device [LA555 available from Piasu Co., Ltd.]. Based on the fact that the smaller the standard deviation in luminance is, the better the solid applicability is, the solid applicability for each of the printing blankets in the examples and the comparative examples was evaluated. Specifically, when the standard deviation in luminance is less than 20.0 and particularly not more than 19.5, the solid applicability is good.

The foregoing results are shown in the following Table 1 to Table 4. In the tables, the porosity (%) of the non-stretchable layer is found by the equation (1) as described above:

Porosity (%)=$S_2/S_1 \times 100$ (1)

The cross-sectional area $S_1$ of the non-stretchable layer 12 is found by the product of the thickness of the non-stretchable layer which is the sum of the outside diameter of the hollow yarn and the thicknesses of the adhesive layers above and below the hollow yarn (both are 0.05 mm) and the width of the non-stretchable layer (i.e., 910 mm which is the length of the sleeve). The total $S_2$ of the areas of the cross sections of the cavity in the hollow yarn HF is found by the product of the cross-sectional area of the cavity and the number of windings of the hollow yarn HF (how many times the hollow yarn HF was wound on the base layer).

The porosity of each of the non-stretchable layers in the comparative examples 1 and 2 using a cotton string which is not in a hollow shape is naturally 0 (%).

TABLE 1

|  | Ex. No. | | | | | | |
| --- | --- | --- | --- | --- | --- | --- | --- |
|  | 2 | 3 | 4 | 1 | 5 | 6 | 7 |
| Outside diameter of hollow yarn (mm) | 0.05 | 0.1 | 0.25 | 0.5 | 0.7 | 1.0 | 1.2 |
| Inside diameter of cavity (mm) | 0.03 | 0.05 | 0.12 | 0.3 | 0.4 | 0.5 | 0.6 |
| Thickness of non-stretchable layer (mm) | 0.15 | 0.2 | 0.35 | 0.6 | 0.8 | 1.1 | 1.3 |
| Porosity of non-stretchable layer (%) | 36 | 25 | 23 | 36 | 33 | 25 | 25 |
| Total thickness of blanket (mm) | 1.75 | 1.8 | 1.95 | 2.2 | 2.4 | 2.7 | 2.9 |

TABLE 1-continued

|  | Ex. No. | | | | | | |
| --- | --- | --- | --- | --- | --- | --- | --- |
|  | 2 | 3 | 4 | 1 | 5 | 6 | 7 |
| Rate of change in peripheral length (%) | 0.20 | 0.14 | 0.12 | 0.1 | 0.08 | 0.06 | 0.04 |
| Standard deviation in luminance | 16.2 | 16.8 | 17.0 | 17.5 | 18.1 | 19.2 | 19.7 |

TABLE 2

|  | Ex. No. | | | | |
| --- | --- | --- | --- | --- | --- |
|  | 8 | 9 | 10 | 11 | 12 |
| Outside diameter of hollow fibers ($\mu$m) | 40 | 40 | 40 | 40 | 40 |
| Inside diameter of cavity ($\mu$m) | 15 | 9 | 12 | 15 | 16 |
| Thickness of non-stretchable layer (mm) | 0.6 | 0.6 | 0.6 | 0.6 | 0.6 |
| Porosity of non-stretchable layer (%) | 14 | 5 | 10 | 14 | 20 |
| Total thickness of blanket (mm) | 2.2 | 2.2 | 2.2 | 2.2 | 2.2 |
| Rate of change in peripheral length (%) | 0.11 | 0.20 | 0.14 | 0.11 | 0.11 |
| Standard deviation in luminance | 16.4 | 16.0 | 16.2 | 16.4 | 16.4 |

TABLE 3

|  | Ex. No. | | | | |
| --- | --- | --- | --- | --- | --- |
|  | 13 | 14 | 15 | 16 | 17 |
| Outside diameter of hollow fibers ($\mu$m) | 40 | 40 | 40 | 40 | 40 |
| Inside diameter of cavity ($\mu$m) | 20 | 28 | 32 | 36 | 37 |
| Thickness of non-stretchable layer (mm) | 0.6 | 0.6 | 0.6 | 0.6 | 0.6 |
| Porosity of non-stretchable layer (%) | 30 | 50 | 70 | 80 | 86 |
| Total thickness of blanket (mm) | 2.2 | 2.2 | 2.2 | 2.2 | 2.2 |
| Rate of change in peripheral length (%) | 0.08 | 0.06 | 0.05 | 0.04 | 0.03 |
| Standard deviation in luminance | 16.8 | 17.2 | 17.8 | 19.2 | 20.1 |

TABLE 4

|  | Comp. 1 | Ex. No. 2 |
| --- | --- | --- |
| Thickness of non-stretchable layer (mm) | 0.6 | 0.6 |

TABLE 4-continued

|  | Comp. 1 | Ex. No. 2 |
| --- | --- | --- |
| Total thickness of blanket (mm) | 2.2 | 2.2 |
| Rate of change in peripheral length (%) | 0.30 | 0.06 |
| Standard deviation in luminance | 15.8 | 17.3 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing blanket comprising:
   (a) a surface printing layer comprising an elastomer formed in a seamless cylindrical shape; and
   (b) a non-stretchable layer arranged inside the surface printing layer and formed by arranging hollow yarn in a predetermined direction.

2. The printing blanket according to claim 1, wherein the non-stretchable layer is formed by winding the hollow yarn in a helical manner in the circumferential direction.

3. The printing blanket according to claim 2, wherein the hollow yarn is composed of a monofilament made of synthetic resin having a cavity within, and the outside diameter thereof is 0.1 to 1.0 mm.

4. The printing blanket according to claim 2, wherein the hollow yarn is formed by arranging in parallel and integrating a plurality of hollow fibers made of synthetic resin each having a cavity within, and the outside diameter thereof is 0.1 to 1.0 mm.

5. The printing blanket according to claim 2, wherein the hollow yarn is formed by twisting a plurality of hollow fibers made of synthetic resin each having a cavity within, and the outside diameter thereof is 0.1 to 1.0 mm.

6. The printing blanket according to claim 1, wherein the porosity of the non-stretchable layer is 10 to 80%.

7. The printing blanket according to claim 1, further comprising
   a base layer arranged inside the non-stretchable layer, comprising an elastomer, and formed in a seamless cylindrical shape in the circumferential direction.

8. The printing blanket according to claim 7, wherein the base layer, the non-stretchable layer and the surface printing layer are laminated in this order on an outer peripheral surface of a cylindrical sleeve to be mounted on a blanket cylinder.

9. The printing blanket according to claim 1, wherein the hollow yarn is formed from a synthetic resin selected from the group consisting of polyester, rayon, nylon, aromatic polyamide, and acrylic resin.

10. The printing blanket according to claim 3, wherein the hollow yarn has an outside diameter of 0.25 to 0.7 mm.

11. The printing blanket according to claim 4, wherein the hollow yarn has an outside diameter of 0.25 to 0.7 mm.

12. The printing blanket according to claim 3, wherein the hollow yarn has an inside diameter for the cavity of 0.05 to 0.5 mm.

13. The printing blanket according to claim 4, wherein the hollow yarn has an inside diameter for the cavity of 0.05 to 0.5 mm.

14. The printing blanket according to claim 3, wherein the hollow yarn has an inside diameter for the cavity of 0.12 to 0.4 mm.

15. The printing blanket according to claim 4, wherein the hollow yarn has an inside diameter for the cavity of 0.12 to 0.4 mm.

16. The printing blanket according to claim 1, wherein the porosity of the non-stretchable layer is 20 to 70%.

17. The printing blanket according to claim 1, wherein the rate of change in peripheral length of the non-stretchable layer is in the range of 0.03 to 0.20%.

18. The printing blanket according to claim 1, wherein the hollow yarn comprises a plurality of hollow fibers arranged in parallel.

* * * * *